United States Patent
Murtaza et al.

(10) Patent No.: US 10,216,678 B2
(45) Date of Patent: Feb. 26, 2019

(54) SERIAL PERIPHERAL INTERFACE DAISY CHAIN COMMUNICATION WITH AN IN-FRAME RESPONSE

(71) Applicant: Infineon Technologies AG, Neubiberg (DE)

(72) Inventors: Diana Raluca Murtaza, Bucharest (RO); Ansgar Pottbaecker, Grafing (DE)

(73) Assignee: Infineon Technologies AG, Neubiberg (DE)

( * ) Notice: Subject to any disclaimer, the term of this patent is extended or adjusted under 35 U.S.C. 154(b) by 430 days.

(21) Appl. No.: 14/531,524

(22) Filed: Nov. 3, 2014

(65) Prior Publication Data

US 2016/0098371 A1   Apr. 7, 2016

Related U.S. Application Data

(60) Provisional application No. 62/060,968, filed on Oct. 7, 2014.

(51) Int. Cl.
    *G06F 13/40* (2006.01)
    *G06F 13/42* (2006.01)

(52) U.S. Cl.
    CPC ...... *G06F 13/4068* (2013.01); *G06F 13/4247* (2013.01); *G06F 13/4282* (2013.01)

(58) Field of Classification Search
    None
    See application file for complete search history.

(56) References Cited

U.S. PATENT DOCUMENTS

| | | | |
|---|---|---|---|
| 6,920,470 B2 | 7/2005 | Page et al. | |
| 7,882,289 B2 | 2/2011 | Furuya | |
| 2004/0117537 A1* | 6/2004 | Marcel Vandensande | G05B 19/0423 710/305 |
| 2007/0165457 A1* | 7/2007 | Kim | G06F 13/1684 365/185.11 |

(Continued)

FOREIGN PATENT DOCUMENTS

| | | |
|---|---|---|
| EP | 0258604 B1 | 12/1993 |
| EP | 2645638 A1 | 10/2013 |
| EP | 2663029 A1 | 11/2013 |

OTHER PUBLICATIONS

"TN0897, Technical note, ST SPI protocol," STMicroelectronics, Doc. ID 023176, Rev. 2, Sep. 2013, 28 pp.

*Primary Examiner* — Henry Tsai
*Assistant Examiner* — Dean Phan
(74) *Attorney, Agent, or Firm* — Shumaker & Sieffert, P.A.

(57) ABSTRACT

In one example, a master device connected in a serial-peripheral interface (SPI) daisy chain configuration with a plurality of servant devices, wherein the master device is configured to output a master data output to a first servant data input of a first servant device of a plurality of servant devices, wherein the plurality of servant devices are connected in a serial-peripheral interface (SPI) daisy chain configuration with the master device. The master device further configured to receive a master data input from a last servant device of the plurality of servant devices, wherein the master data input comprises an in-frame response of the plurality of servant devices, and wherein the in-frame response is received by the master device in a single SPI communication frame.

20 Claims, 6 Drawing Sheets

(56) References Cited

U.S. PATENT DOCUMENTS

| | | | |
|---|---|---|---|
| 2007/0233917 A1* | 10/2007 | Pyeon | G06F 13/4291 710/100 |
| 2010/0138576 A1* | 6/2010 | Goerlich | G06F 13/4291 710/110 |
| 2012/0076146 A1 | 3/2012 | Rohatschek et al. | |
| 2014/0025999 A1* | 1/2014 | Kessler | G06F 13/4295 714/43 |

* cited by examiner

SERIAL PERIPHERAL INTERFACE DAISY CHAIN COMMUNICATION WITH AN IN-FRAME RESPONSE

TECHNICAL FIELD

This disclosure relates to serial peripheral interface communication, and in particular, to serial-peripheral interface daisy chain communication.

BACKGROUND

Serial Peripheral Interface (SPI) is a synchronous serial communication interface for sending and receiving data. Typically, the SPI is used for communication between a host microcontroller ("master") and peripherals ("servants"). The SPI bus may have four signals, for example, a serial clock signal ("SCLK"), a chip select signal ("CSN"), a serial data input signal ("SDI"), and a serial data output signal ("SDO"). The serial clock signal provides synchronization between the master and the servants, however, only a selected servant device receives the chip select signal (e.g., an active LOW signal), which enables only the selected servant device to accept and respond to the SPI command ("frame"). Input and output data are synchronized and transferred simultaneously on both data lines (e.g., SDI and SDO).

Generally, the master initiates the communication by changing the signal on the CSN line to a LOW state. A period of time after the signal on the CSN line is a LOW state, the master provides clock pulse signals on the SCLK line to the servant devices. With each SPI clock cycle the master sends bits on the SDI line and receives bits on the SDO, which are typically eight or sixteen bit words.

SUMMARY

In general, the techniques described in this disclosure are related to a master device in a serial peripheral interface (SPI) daisy chain communication with a plurality of servant devices, and the master provides a token in the address of each servant device to enable an in-frame response from the plurality of servant devices. For example, during the first half of a frame, a master device may communicate addresses, each address including a token, to the plurality of servant devices. The last address includes a token indicating that it is the last address of the servant devices, which may also be indicative of the end of the first half of the frame. During the second half of the frame, the master device may communicate data to the plurality of servant devices, while simultaneously receiving an in-frame response (e.g., all the responses from the plurality of servant devices), which was generated from the addresses received by the plurality of servant devices in the first half of the frame.

In one example, a master device is configured to output a master data output to a first servant device of a plurality of servant devices, wherein the plurality of servant devices are connected in a serial-peripheral interface (SPI) daisy chain configuration with the master device. The master device may be further configured to receive a master data input from a last servant device of the plurality of servant devices, wherein the master data input comprises an in-frame response of the plurality of servant devices, and wherein the in-frame response is received by the master device in a single SPI communication frame.

In another example, a servant device is configured to receive a servant data input, and output a servant data output, wherein the servant data output includes a portion of an in-frame response based on the servant data input, and wherein the in-frame response is received by the master device in a single SPI communication frame.

In another example, a system includes a master device, and a plurality of servant devices connected in a serial-peripheral interface (SPI) daisy chain configuration with the master device, wherein the master device is configured to communicate with a first servant device and a last servant device of the plurality of servant devices. The system further includes wherein the master device is configured to communicate a master data output to the first servant device of the plurality of servant devices, wherein the master device is configured to receive a master data input including an in-frame response of the plurality of servant devices from the last servant device in the plurality of servant devices, and wherein the in-frame response is received by the master device in a single SPI communication frame.

The details of one or more examples are set forth in the accompanying drawings and the description below. Other features, objects, and advantages of the features described herein will be apparent from the description and drawings, and from the claims.

DETAILED DESCRIPTION

In general, servant devices in a serial peripheral interface (SPI) daisy chain interpret the addresses sent by the master device only after the SPI frame ends. In this manner, responses from any of the SPI servant devices may only be provided to the master device during the next SPI communication frame. In other words, the master device may need to use at least two SPI communication frames in order to receive a response, which increases the amount of time needed for obtaining the information requested by the master device.

Techniques according to this disclosure may enable the master device to use a single SPI communication frame for receiving a response from each servant device based the addresses of each servant device. In some examples, each of the servant devices in the daisy chain may have the capability to recognize its own address immediately after its respective address is received, without waiting the end of the current frame. In these examples, each of the servant devices may also output (e.g., "load and shift out") the response to its address during the same frame.

For instance, the master device may use two bits in the address field (e.g., "tokens"). In this example, the token may enable the servant devices to distinguish between global responses (e.g., default responses from servant devices), and addresses of the servant devices including the last address of the servant devices. In this way, each servant device may identify and memorize their address before the end of the SPI frame, and may recognize when the last address is sent by the master device.

In some examples, the address fields for the servant devices may be sent by the master device in the first half of the SPI frame. The two bits reserved in each address field (e.g., the "token") may offer the information that the last address field (e.g., the address of the last servant device in the daisy chain of servant device) has been sent by the master device. This information with respect to the last address may enable the servant devices to transmit their responses through the chain in the second half of the frame. In other words, in a single SPI frame (e.g., the first and second half of the frame), the master device may receive the responses based on the addresses of the servant devices from all the servant devices in the daisy chain, which may be referred to as an "in-frame response" of the servant devices.

In some examples, the in-frame response may allow the master device to communicate with the servant devices in a single SPI frame, instead of two SPI frames. In this way, the amount of time required for communication between the master device and the servant devices may be reduced. Additionally, this may enable the master device to operate with increased power efficiency.

Figure 1:
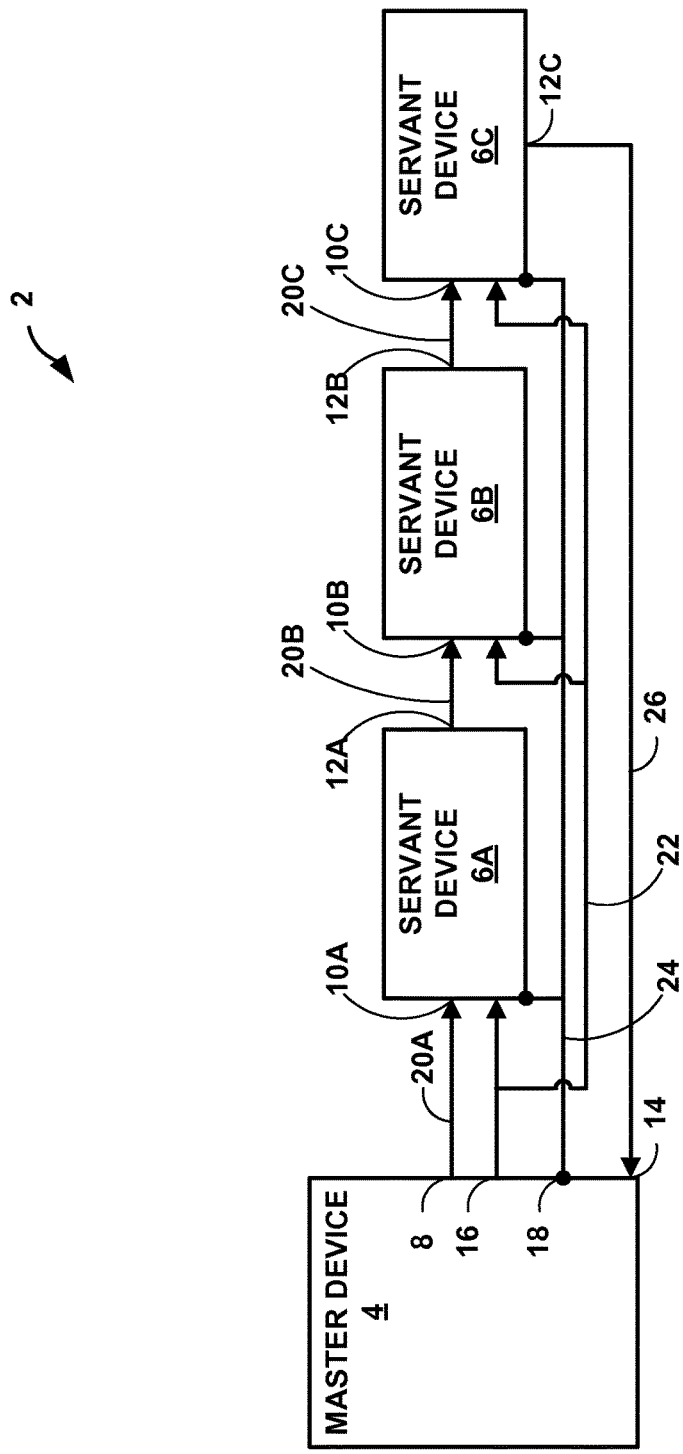
FIG. 1 is a block diagram illustrating an example system for serial-peripheral interface (SPI) daisy chain communication of a master device with an in-frame response from a plurality of servant devices, in accordance with one or more aspects of the present disclosure.

FIG. 1 is a block diagram illustrating an example system for serial-peripheral interface (SPI) daisy chain communication of a master device with an in-frame response from a plurality of servant devices, in accordance with one or more aspects of the present disclosure. System 2 includes master device 4, servant devices 6A-6C (collectively "servants 6"), master data output 8, servant data inputs 10A-10C (collectively "servant data inputs 10"), servant data outputs 12A-12C (collectively "servant data outputs 12"), master data input 14, serial clock 16, chip select line 18, input links 20A-20C (collectively "input links 20"), SCLK link 22, and CSN link 24.

Master device 4 may be a host microcontroller that can output at least four signals: master data output 8, master data input 14, serial clock 16, and chip select line 18. Master data output 8 may be an output signal from master device 4 to servants 6 that includes addresses and data (e.g., serial data outputs) for servants 6. Master data input 14 may be an input signal from the last servant of servants 6 to master device 4 that includes global responses and responses based on addresses (e.g., serial data outputs) from servants 6. Serial clock (SCLK) 16 may be a signal with clock pulses provided by master device 4 to servants 6 for synchronization between master device 4 and servants 6. Chip select line (CSN) 18 may be a selection signal provided by master device 4 to only a selected servant device of servants 6. In some examples, CSN 18 may be active LOW, where the selected servant device of servants 6 may receive a LOW signal to indicate the selection of the selected servant device. In other examples, CSN 18 may be active HIGH, where the selected servant device of servants 6 may receive a HIGH signal to indicate the selection of the selected servant device.

Servants 6 may include servant devices connected in a daisy chain configuration that can receive a signal and output a signal: servant data inputs 10 and servant data outputs 12. Servant data inputs 10 may be input signals that include global responses, addresses, responses, and data (e.g., serial data inputs) for each servant device of servants 6. Servant data outputs 12 may be output signals from servants 6 that include global responses, addresses, responses, and data (e.g., serial data outputs) from each servant of servant 6.

Input links 20, SCLK link 22, CSN link 24, output link 26 generally represent any medium capable of conducting electrical signals from one location to another. Examples of input links 20, SCLK link 22, CSN link 24, and output link 26 include, but are not limited to, wireless and physical electrical transmission mediums such as electrical wires, electrical traces, or any other wireless or physical electrical transmission medium. Input links 20 and output link 26, in some examples, may connect an output port to an input port. For example, input link 20A may connect the output port of master device 4 to the input port of servant device 6A. In another example, output link 26 may connect the output port of servant device 6C to the input port of master device 4. The respective ports of the master and servant devices may be configured to support communications according to a SPI daisy chain. The SPI daisy chain may be formed by master device 4 and any plurality of servant devices 6 where master device 4 and servant devices are connected in a ring network formation.

In general, master device 4 provides SCLK 16 to servants 6 over SCLK link 22 and only the selected servant of servants 6 may receive CSN 18 via CSN link 24. In this manner, only a selected one of servants 6 may accept and respond to the serial peripheral interface command (e.g., "SPI frame") from master device 4. Master data output 8 and master data input 14 may be synchronized and transferred simultaneously on both data lines (e.g., input links 20 and output link 26).

Master device 4 may initiate the communication (e.g., at the beginning of the SPI frame) in an active LOW configuration by changing CSN 18 on CSN link 24 to a LOW state. A period of time after CSN 18 on the CSN link 24 is in a LOW state, master device 4 may provide SCLK 16 on SCLK link 22 to servants 6. With each serial peripheral interface clock cycle, master device 4 may transmit master data output 8, which may be bits over input links 20, and may receive master data input 14, which may be bits over output link 26. In some examples, the bits may include, but not limited to, eight and sixteen bits.

Master device 4 may include any one or more microprocessors, digital signal processors (DSPs), application specific integrated circuits (ASICs), field programmable gate arrays (FPGAs), or any other equivalent integrated or discrete logic circuitry, as well as any combinations of such components. When master device 4 includes software or firmware, master device 4 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Servants 6 may include any one or more microprocessors, digital signal processors (DSPs), application specific integrated circuits (ASICs), field programmable gate arrays (FPGAs), or any other equivalent integrated or discrete logic circuitry, as well as any combinations of such components. When servants 6 include software or firmware, servants 6 further include any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

In the example of FIG. 1, master 4 and servants 6 are arranged in a daisy chain configuration, such that master device 4 communicates with the first and last servant devices of servants 6. In the daisy chain configuration, master data output 8 may be output by master device 4 to servant device 6A over input link 20A, which may receive master data output 8 as servant data input 10A. Servant data output 12A of servant device 6A may be output by servant device 6A to servant device 6B over input link 20B, which may receive servant data output 12 as servant data input 10B. Servant data output 12B of servant device 6B may be output by servant device 6B to servant device 6C over input link 20C, which may receive servant output 12B as servant data input 10C. Servant data output 12C of servant device 6C may be output by servant device 6C to master device 4 over output link 26, which may be received by master device 4 as master data input 14. In some examples, servants 6 may include more than three servant devices connected master device 4 and arranged in a daisy configuration.

In the example of FIG. 1, each of servants 6 may be designed as a simple shift register. In the daisy chain configuration, servants 6 may combine to be a long shift register. At the end of the SPI frame, master device 4 may change CSN 18 on CSN link 24 to a HIGH state, and each of servants 6 may have in the respective shift register the data sent to servants 6 by master device 4. In this manner, master device 4 only uses a single SPI communication frame (e.g., a single change of state for CSN 18 over CSN link 24) to transmit addresses and receive responses from servants 6.

In the example of FIG. 1, master device 4 may be configured to receive master data input 14, which may include an in-frame response of servants 6 from the last servant in servants 6 over output link 26. In this example, the in-frame response may be received by master device 4 in a single SPI communication frame.

In some examples, master device 4 may be connected in a serial-peripheral interface (SPI) daisy chain configuration with servants 6. In these examples, master device 4 may be configured to output master data output 8 to servant device 6A of servants 6, wherein servants 6 are connected in a serial-peripheral interface (SPI) daisy chain configuration with master device 4. The network of master device 4 and servants 6 may form a ring where communication pass from the master device 4, through all the servants 6, before returning to the master device 4. The communications may be used and manipulated by servants 6, and the communication that returns to the master device 4 may include in-frame responses from the servants 6. Accordingly, in these examples, master device 4 may further be configured to receive a master data input 14 from a last servant device of the plurality of servant devices, wherein the master data input 14 may include an in-frame response of servants 6, and wherein the in-frame response may be received by master device 4 in a single SPI communication frame.

In some examples, a first portion of master data output 8 may include addresses of servants 6. In some examples, a second portion of master data output 8 may include data for servants 6. In some examples, the first and second portions of master data output 8 may form the single SPI communication frame. In these examples, master device 4 may not output the second portion of master data output 8 until after each servant device of servants 6 receives a last address of the addresses of servants 6. In some examples, the addresses of servants 6 may be in an order of the SPI daisy chain configuration. In some examples, the data for servants 6 may be in the order of the SPI daisy chain configuration. In some examples, the in-frame response may include the respective responses from servants 6, wherein the respective responses may be based on the addresses of servants 6. In these examples, the respective responses from servants 6 may be received by master device 4 in an order inverse to the SPI daisy chain configuration.

In some examples, each of the addresses of servants 6 may include at least two bits as a token. In these examples, the at least two bits may be least significant bits. In some examples, the token may be at least one of a first state (e.g., a LOW bit and a HIGH bit or "01"), wherein the first state is indicative of leading addresses of the addresses of the plurality of servant devices, or a second state (e.g., two HIGH bits or "11"), wherein the second state is indicative of a last address of the addresses of the plurality of servant devices.

In some examples, a servant device of servants 6 may be connected in a serial-peripheral interface (SPI) daisy chain configuration with master device 4. In these examples, the servant device may be configured to receive a servant data input, and output a servant data output, wherein the servant data output may include a portion of an in-frame response based on the servant data input, and wherein the in-frame response may be received by master device 4 in a single SPI communication frame. In some examples, the portion of the in-frame response may include a respective response based on a respective address of the servant device.

In some examples, a first portion of the servant data input may include one or more addresses of servants 6. In some examples, a second portion of servant data input may include data for servants 6. In some examples, the first and second portions of the servant data input may form the single SPI communication frame. In some examples, the one or more addresses of servants 6 may be arranged in an order of a SPI daisy chain configuration. In some examples, the data for servants 6 may be arranged in the order of the SPI daisy chain configuration.

In some examples, each servant device may be further configured to store a respective address of the servant device from the servant data input, and remove the respective address from the servant data input. In these examples, each servant device may also be further configured to identify a last address in the first portion of the servant data input, generate a respective response based on the stored respective address upon identifying the last address in first portion of the servant data input, and output the respective response as the portion of the in-frame response in the servant data output.

In some examples, a first portion of the servant data output may include one or more global responses of servants 6. In some examples, a second portion of the servant data output may include one or more addresses of servants 6. In some examples, a third portion of the servant data output may include one or more responses of servants 6. In some examples, a fourth portion of the servant data output may include data for servants 6.

In some examples, each of the one or more addresses of servants 6 may include at least two bits as a token. In these examples, the at least two bits may be least significant bits. In some examples, each of the one or more global responses may include the token. In some examples, the token may be selected from a group consisting of a first state (e.g., a LOW bit and a HIGH bit or "01"), a second state (e.g., two HIGH bits or "11"), or a third state (e.g., a HIGH bit and a LOW bit or two LOW bits or "x0", where x is "0" or "1"). In these examples, the first state may be indicative of leading addresses of the one or more addresses of servants 6. In these examples, the second state may be indicative of a last address of the one or more addresses of servants 6. In these examples, the third state may be indicative of the one or more global responses of servants 6.

In some examples, system 2 may include master device 4, and servants 6 connected in a serial-peripheral interface (SPI) daisy chain configuration with the master device, wherein the master device may be configured to communicate with servant device 6A and a last servant device (e.g., servant device 6C) of servants 6. In these examples, the master device may be further configured to communicate master data output 8 to servant device 6A of servants 6, wherein the master device may be configured to receive master data input 14 including an in-frame response of servants 6 from the last servant device in servants 6, and wherein the in-frame response may be received by master device 4 in a single SPI communication frame.

In some examples, a first portion of master data output 8 may include addresses of servants 6, wherein each of the addresses of servants 6 may include a token. In some examples, a second portion of master data output 8 may include data for servants 6. In some examples, the first and second portions of master data output 8 may form the single SPI communication frame.

In some examples, a first portion of master data input 14 may include global responses of servants 6, wherein each of the global responses of servants 6 may include the token. In some examples, a second portion of master data input 14 may include the in-frame response of servants 6. In some examples, the first and second portions of master data input 14 may form the single SPI communication frame.

In some examples, the token may be selected from a group consisting of a first state (e.g., a LOW bit and a HIGH bit or "01"), a second state (e.g., two HIGH bits or "11"), or a third state (e.g., HIGH bit and a LOW bit or two LOW bits or "x0"). In these examples, the first state may be indicative of leading addresses of the addresses of servants 6. In these examples, the second state may be indicative of a last address of the addresses of servants 6. In these examples, the third state may be indicative of the global responses of servants 6.

In some examples, each servant device of servants 6 may be configured to receive a servant data input, wherein the servant data input includes addresses of the plurality of servant devices, store a respective address of the servant device, and remove the respective address from the servant data input. In these examples, each servant device of servants 6 may be further configured to identify a last address in the addresses of the servant data input, generate a respective response based on the stored respective address upon identifying the last address in the addresses of the servant data input, and output the respective response as the portion of the in-frame response in a servant data output.

In some examples, system 2 may include any number of servant devices connected in a daisy chain with two bits reserved in the address field of each servant device. In these examples, one bit may be used as a unique mark, such that each servant device may be able to differentiate between a transmitted address and a global response. In these examples, one bit may also be reserved to differentiate between the leading addresses and the last address of servants 6.

In some examples, system 2 in a daisy chain configuration may significantly reduce wiring by requiring fewer outputs from master device 4, and the token in the address of each servant of servant 6 may enable an in-frame response between master device 4 and servants 6. In this manner, master device 4 may be able to communicate with servants 6 with increased speed and efficiency.

Figure 2:
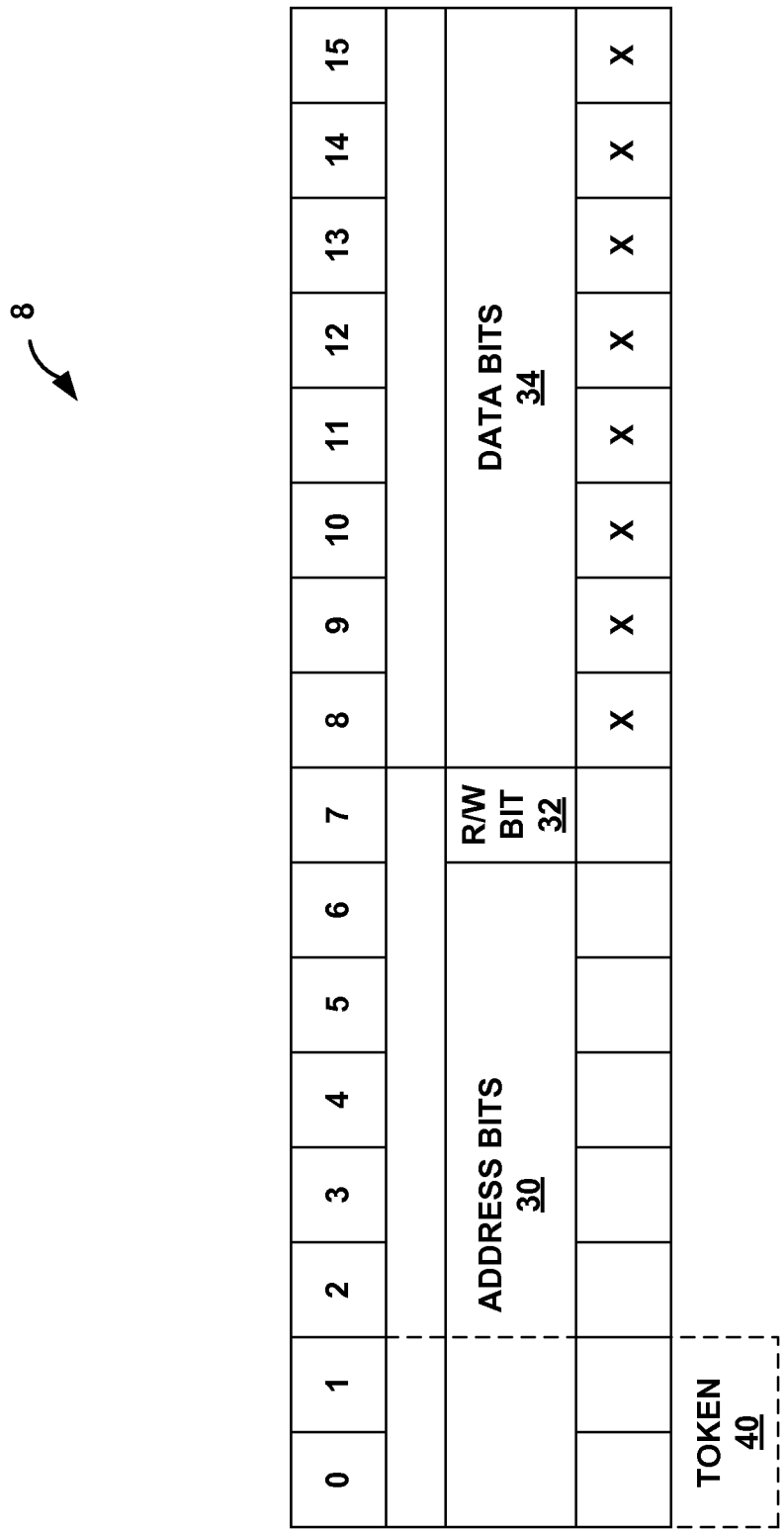
FIG. 2 is a block diagram illustrating details of an example output of a master device for SPI daisy chain communication with an in-frame response from a plurality of servant devices, in accordance with one or more aspects of the present disclosure.

FIG. 2 is a block diagram illustrating details of an example output of a master device for SPI daisy chain communication with an in-frame response from a plurality of servant devices, in accordance with one or more aspects of the present disclosure. FIG. 2 is described with reference to FIG. 1.

In the example of FIG. 2, master data output 8 may include a plurality of bits. As illustrated in FIG. 2 for illustration purposes only, master data output 8 is a 16 bit word, which may include address bits 30, read/write bit (R/W) 32, data bits 34, and token 40. Address bits 30 may include the addresses of servants 6. In some examples, seven bits such as bits 0-6 of master data output 8 may include the address of servant device 6A of servants 6. R/W bit 32 may be indicative of whether data bits 34 are a read operation or a write operation. In some examples, a single bit, such as bit 7 of master data output 8 may include the indication of a write operation, which may update the addressed register of one of servants 6 with the received data byte. In other examples, a single bit, such as bit 7 of master data output 8 may include the indication of a read operation, which may not update the register of one of servants 6 with the received data byte. Data bits 34 may include the data ("payload) for servants 6. In some examples, eight bits, such as bits 8-15 of master data output 8 may include the data for servant device 6A of servants 6. Token 40 may include three states (e.g., "01", "11", or "x0"), such that a first state may be indicative of a leading address of a respective servant device of servants 6, a second state may be indicative of the address of the last servant device in servants 6, and a third state may be indicative of a global response from a respective servant device of servants 6.

In some examples, token 40 may include the least significant bits of the address of each servant device (e.g., bits 0 and 1 of master data output 8). In some examples, the token may be a first state (e.g., a LOW bit and a HIGH bit or "01"), which may be indicative of an address of the respective servant of servants 6. In some examples, token 40 may be a second state (e.g., two HIGH bits or "11"), which may be indicative of an address of the last servant device in servants 6. In some examples, token 40 may be a third state (e.g., a LOW bit or "x0"), which may be indicative of a global response (e.g., "default response") of a respective servant device of servants 6. In some examples, one or more counter devices that store the number of times a particular event has occurred may be used in combination with token 40. In some examples, the one or more counter devices may be included in master device 4 and/or servants 6. In other examples, one or more counter devices may be used in place of token 40 to indicate three states, such that a first state may be indicative of a leading address of a respective servant device of servants 6, a second state may be indicative of the address of the last servant device in servants 6, and a third state may be indicative of a global response from a respective servant device of servants 6.

In some examples, servants 6 may not read-write data bits 32 until after receiving from master device 4, token 40, which may be indicative of an address of servant device 6C of servants 6 (e.g., a token of two HIGH bits, "11"). In some examples, servants 6 may not receive data bits 36 until after receiving from master device 4 token 40 indicative of an address of servant device 6C of servants 6 (e.g., a token of two HIGH bits, "11"). In some examples, token 40 may enable master device 4 to receive an in-frame response from servants 6. In other words, token 40 may allow servants 6 to respond master device 4 in the same frame that master device 4 outputs addresses in master data output 8.

Figure 3:
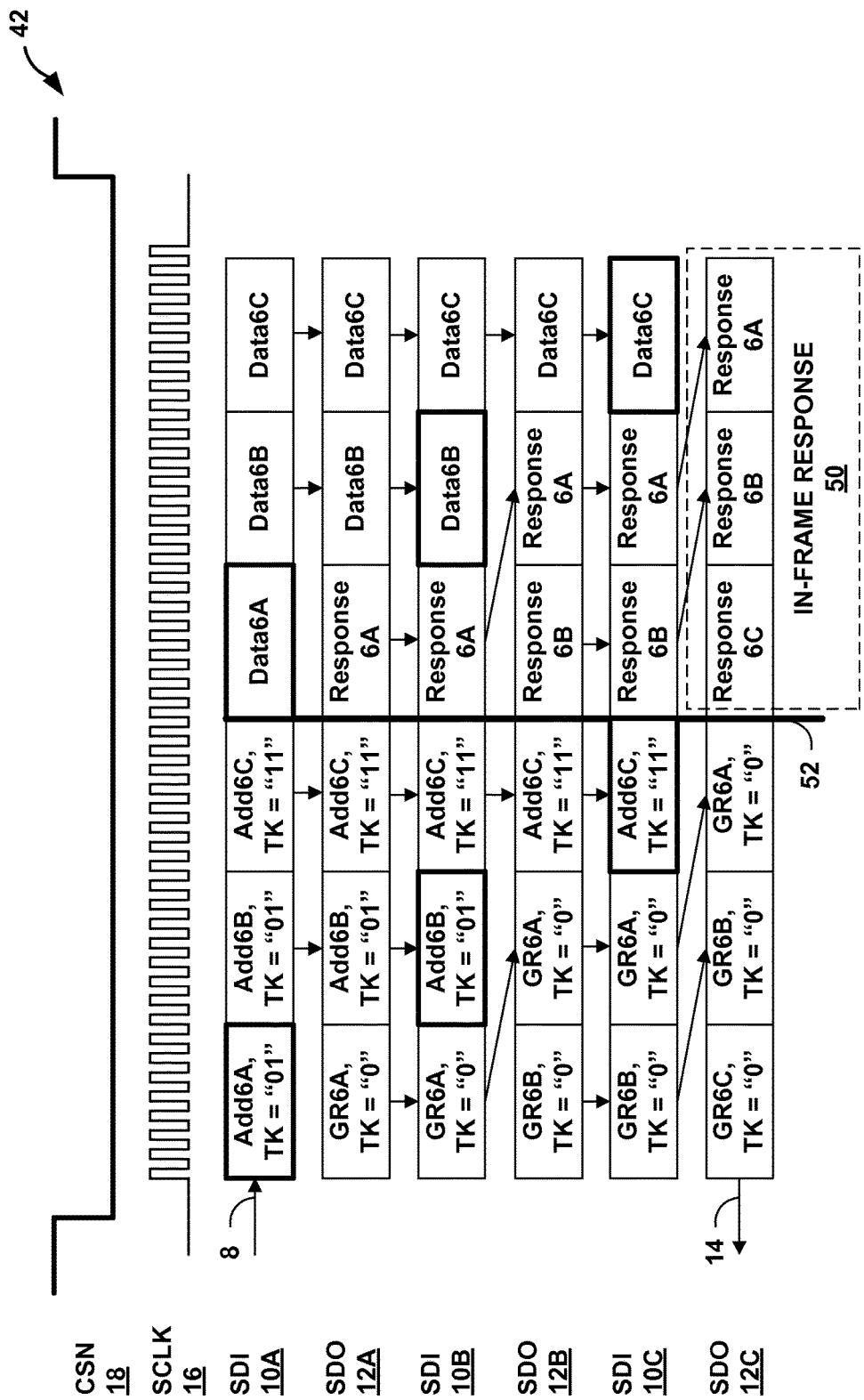
FIG. 3 is a flow diagram illustrating details of another example output of a master device for SPI daisy chain communication with an in-frame response from a plurality of servant devices, in accordance with one or more aspects of the present disclosure.

FIG. 3 is a flow diagram illustrating details of another example output of a master device for SPI daisy chain communication with an in-frame response from a plurality of servant devices, in accordance with one or more aspects of the present disclosure. FIG. 3 is described with reference to FIGS. 1 and 2. As illustrated in the example of FIG. 3, system 42 may include MDO 8, SDI 10A, 10B, and 10C (collectively "SDIs 10"), SDO 12A, 12B, and 12C (collectively "SDOs 12"), MDI 14, SCLK 16, and CSN 18, which may correspond to master data output 8, servant data inputs 10A, 10B, and 10C, servant data outputs 12A, 12B, and 12C, master data input 14, SCLK 16, and CSN 18, respectively, as described in FIG. 1.

System 42 includes in-frame response 50 and last address line 52. In-frame response 50 may include the responses of servants 6, which may be received by master device 4 in MDI 14, and in the same frame that master device 4 transmits addresses of servants 6 in MDO 8. Last address line 52 may be the division between a first portion and a second portion of MDO 8. In some examples, last address line 52 may be the division between the first and second half of a single SPI communication frame.

System 42 further includes Add6A-Add6C, GR6A-GR6C, Data6A-Data6C, Response 6A-Response 6C, and TK. Add6A-Add6C may be the addresses of servants 6 in a first portion of MDO 8. For example, Add6A may be the address of servant device 6A, Add6B may be the address of servant device 6B, and Add6C may be the address of servant device 6C. GR6A-GR6C may be the global responses of servants 6, which may be generated and outputted by servants 6 upon receiving the address of the respective servant. Data6A-Data6C may be data for servants 6 in a second portion of MDO 8. Responses 6A-Response 6C may be the respective responses from servants 6 to master device 4 in response to receiving a token indicative of the address of the last servant in servants 6. In some examples, Responses 6A-6C may be based on Add6A-Add6C, respectively. In some examples, Responses 6A-6C may form in-frame response 50.

TK may be a token associated with each of the addresses of servants 6. In general, each servant device in servants 6 receives information from the token ("TK"). The information may include at what moment in the frame an address of a respective servant may be sent over input links 20. In other words, the token ("TK") may provide each servant in servants 6 the capability of identifying whether the bits sent over input links 20 are a global response or an address including the last address of servants 6. In the example of FIG. 3, for purposes of illustration only, a token with a first state (e.g., one LOW bit and one HIGH bit) is associated with leading addresses of servants 6, a token with a second state (e.g., two HIGH bits) is associated with the last address of servants 6, and a token with a third state (e.g., a LOW bit) is associated with a global response. Although, in some examples, any combination or permutation of states (e.g., two or more bits) may be used to provide the distinction between the global responses, the leading addresses of servants 6, and the last address of servants 6.

To utilize the capability provided by the token, in some examples, the bits shifted by master device 4 may be in an order such that all address words are shifted, and only after the token indicating the last address (e.g., "TK=11") of servants 6 is received by each servant device in servants 6 may data bytes be received by servants 6. Hence, last address line 52 may be the division in the frame when the last servant in servants 6 receives its respective address ("the last address" or "TK=11"). In this manner, the use of the token ("TK") may prevent each servant in servants 6 from confusing an address with a response from a previous servant device in the daisy chain configuration.

In some examples, at the falling edge of CSN 18, servants 6 may load their 8-bit global response (e.g., GR6A, GR6B, and GR6C) in their shift register to start outputting the respective global response in SDOs 12 over input links 20 and output link 26. Simultaneously, master device 4 may transmit the first 8-bit address with associated token in MDO 8.

In some examples, servant device 6A of servants 6 may receive in SDI 10A the address word (e.g., Add6A) immediately after CSN 18 goes LOW, but all the other servants in servants 6 may receive global responses from the servants connected in chain in front of them. For example, as illustrated by arrows in FIG. 3, servant device 6B may receive in SDI 10B the global response (e.g., GR6A) from SDO 12A of servant device 6A, servant device 6C may receive in SDI 10C the global response (e.g., GR6B) from SDO 12B of servant device 6B, and master device 4 may receive in MDI 14 the global response (e.g., GR6C) from SDO 12C of servant device 6C. In order to distinguish between a global response from a previous servant and an address word, the token ("TK") may be defined to differentiate address and global responses. In the example of FIG. 3, the token may be defined such that all addresses to be defined with a HIGH least significant bit (e.g., "01" or "11"), and all global responses do not have a HIGH least significant bit (e.g., "0" or "00"). In this manner, by checking the token (e.g., the least significant bit of each received byte), each servant device in servants 6 may differentiate between addresses and global responses.

In some examples, servants 6 may load their respective response (e.g., Response 6A, Response 6B, or Response 6B), which may the content of the register which is located at the received address, but only after master device 4 finishes sending all addresses for servants 6. The token indicating the last address was sent by master device 4 is therefore also necessary. In these examples, the token may be defined such that all addresses except the last address may be defined with a single HIGH least significant bit (e.g., "01"), and the last address may be defined with two HIGH least significant bits (e.g., "11"). In this manner, by checking the token (e.g., the least significant bit of each received byte), each servant device in servants 6 may identify a last address among a plurality of addresses. In other words, defining a token ("TK") in the address field may enable each servant in servants 6 to differentiate between an address and a global response, and whether the address is the last address. In this way, the token may enable each servant device in servants 6 to have the information necessary to identify their own respective address from global responses, and to send their respective response at the right time.

In some examples, each servant in servants 6 may be enabled to output the plurality of addresses until the servants detects its own address (e.g., at least one HIGH bit, "1"). After detecting its own address, if the address of the respective servant is not the last address (e.g., TK does not have two HIGH bits, "11"), the respective servant of servants 6 may remove its respective address (e.g., disable the shifting of the address) and may copy the SDI to SDO until the last address is identified. In this manner, the next servants in servants 6 connected in the daisy chain may receive their addresses sent by master device 4 immediately (in real time) as indicated by the down arrows in FIG. 3.

In some examples, after the last address is detected (e.g., TK has two HIGH bits, "11"), servants 6 may cross the last address line 52 and prepare for receiving data bits (e.g., Data6A, Data6B, and Data6C) from master device 4. To prepare, each servant in servants 6, may generate their respective response (e.g., Response 6A, Response 6B, and Response 6C) in the shift register of each servant in servants 6 and each servant may begin outputting its respective response.

In some examples, the outputting of data bits (e.g., Data6A, Data6B, and Data6C) by master device 4 may mirror the manner in which the addresses were received by servants 6. In other words, data bits may be removed (e.g., shifting disabled) and the SDI may be copied to SDO, after exactly the same number of bytes that were received since the beginning of the frame until the detection of the respective address. In this way, at the end of the SPI command, each servant in servants 6 may have in its own shift register its respective data byte.

In some examples, the outputting (e.g., "shifting") of responses (e.g., Response 6A, Response 6B, and Response 6C) may mirror the manner in which the global responses were received by servants 6. In this way, at the end of the SPI command, each servant in servants 6 may transmit its respective response to master device 4 while CSN 18 is LOW. In other words, the outputting of responses (e.g., Response 6A, Response 6B, and Response 6C) may occur while CSN 18 is LOW, and may form in-frame response 50.

In some examples, each servant of servants 6 may have incorporated a modulo counter to reduce the risks of accepting SPI commands sent incomplete by master device 4. In these examples, each servant device of servants 6 may accept and process input data (at the rising edge of CSN 18) only if the number of SCLK 16 clock pulses was a multiple of the modulo counter.

Additionally, in some examples, if the SPI communication frame may be finished before the data word was received (the number of bytes received after the last address is identified as less than the number of bytes received since the beginning of the frame until the last address was received) the condition can be signaled to master device 4. For example, a status bit in an internal register may be read by master device 4. In another example, the last servant in servants 6 may transmit a HIGH over output link 26 at the beginning of the next SPI communication frame, until first SCLK pulse of SCLK 16.

Additionally or alternatively, in some examples, simple shift register servants (e.g., servants that respond in the next frame) may be connected in the same daisy chain as servants 6. This is possible since each servant in servants 6 may copy its respective SDI to SDO after its respective data word is received. However, the simple shift register servants may only be connected after servants 6.

In an example implementation of system 42, CSN 18 is set to a LOW state. After a period of time, SCLK 16 may initiate and master device 4 may output in MDO 8 the address of servant device 6A with the associated token defined with one LOW bit and one HIGH bit (e.g., Add6A and TK="01") to SDI 10A of servant device 6A. Simultaneously, each servant in servants 6 may generate their respective global response (e.g., GR6A, GR6B, or GR6C) and output their respective global responses of servants 6 in SDOs 12. For example, servant device 6A may output GR6A in SDO 12A to SDI 10B of servant device 6B as indicated by the down arrow, servant device 6B may output GR6B in SDO 12B to SDI 10C of servant device 6C as indicated by the down arrow, and servant device 6C may output GR6C in SDO 12C to MDI 14 of master device 4 as indicated by the right-to-left arrow.

As illustrated by the bolded rectangle around Add6A in FIG. 3, servant device 6A may identify and store its respective address. Upon servant device 6A identifying its respective address, servant device 6A may automatically output its SDI 10A to SDO 12A.

Following the output of the address of servant device 6A, master device 4 may output in MDO 8 the address of servant device 6B with the associated token defined with one LOW bit and one HIGH bit (e.g., Add6B and TK="01") to SDI 10A of servant device 6A. Simultaneously, servant device 6A may output the address of servant device 6B in SDI 10A to SDO 12A and in SDO 12A to SDI 10B, as indicated by the down arrows. Additionally, each servant in servants 6 with a global response in their register (e.g., GR6A, GR6B, or GR6C), may output the global response. For example, servant device 6B may output GR6A from SDI 10B to SDO 12B as indicated by the diagonal left-to-right arrow, and SDO 12B to SDI 10C of servant device 6C as indicated by the down arrow, and servant device 6C may output GR6B in SDI 10C to SDO 12C as indicated by the diagonal left-to-right arrow, and in SDO 12C to MDI 14 of master device 4 as indicated by the right-to-left arrow.

As illustrated by the bolded rectangle around Add6B in FIG. 3, servant device 6B may identify and store its respective address. Upon servant device 6B identifying its respective address, servants 6A and 6B may automatically output SDI 10A to SDO 12A and SDI 10B to SDO 12B, respectively.

Following the output of the address of servant device 6B, master device 4 may output in MDO 8 the address of servant device 6C with the associated token defined with two HIGH bits (e.g., Add6C and TK="11") to SDI 10A of servant device 6A. Simultaneously, servants 6A and 6B may output the address of servant device 6C in SDI 10A to SDO 12A, in SDO 12A to SDI 10B, and in SDI 10B to SDO 12B, respectively, as indicated by the down arrows. In this example, servants 6A and 6B may recognize the token associated with Add6C is the last address. Additionally, each servant in servants 6 with a global response in their register (e.g., GR6A, GR6B, or GR6C), may output the global response. For example, servant device 6C may output GR6A in SDO 12C as indicated by the diagonal left-to-right arrow, and in SDO 12C to MDI 14 of master device 4 as indicated by the right-to-left arrow.

As illustrated by the bolded rectangle around Add6C in FIG. 3, servant device 6C may identify and store its respective address. Upon servant device 6C identifying its respective address, servants 6 may cross last address line 52 by generating their respective responses (e.g., Response 6A, Response 6B, and Response 6B) according to their respective stored addresses. Servants 6 may generate their respective responses because servants 6 may recognize that the token associated with Add6C (e.g., TK="11") is indicative that Add6C is the last address of servants 6.

Following the output of the address of servant device 6C, master device 4 in MDO 8 may output the data of servant device 6A (e.g., Data6A) to SDI 10A of servant device 6A. Additionally, each servant in servants 6 with a response in their register (e.g., Response 6A, Response 6B, or Response 6C), may output the response. For example, servant device 6A may output Response 6A in SDO 12A to SDI 10B of servant device 6B as indicated by the down arrow, servant device 6B may output Response 6B in SDO 12B to SDI 10C of servant device 6C as indicated by the down arrow, and servant device 6C may output Response 6C in SDO 12C to MDI 14 of master device 4 as indicated by the right-to-left arrow.

As illustrated by the bolded rectangle around Data6A in FIG. 3, servant device 6A may identify its respective data by assuming that its respective data will be received in same order as its respective address was received. Upon servant device 6A identifying its respective data, servant device 6A may automatically output its SDI 10A to SDO 12A.

Following the output of the data of servant device 6A, master device 4 in MDO 8 may output the data of servant device 6B (e.g., Data6B) to SDI 10A of servant device 6A. Simultaneously, servant device 6A may output the data of servant device 6B in SDI 10A to SDO 12A and in SDO 12A to SDI 10B, as indicated by the down arrows. Additionally, each servant in servants 6 with a response in their register (e.g., Response 6A, Response 6B, or Response 6C), may output the response. For example, servant device 6B may output Response 6A in SDI 10B to SDO 12B as indicated by the diagonal left-to-right arrow, and SDO 12B to SDI 10C of servant device 6C as indicated by the down arrow, and servant device 6C may output Response 6B in SDI 10C to SDO 12C as indicated by the diagonal left-to right arrow, and in SDO 12C to MDI 14 of master device 4 as indicated by the right-to-left arrow.

As illustrated by the bolded rectangle around Data6B in FIG. 3, servant device 6B may identify its respective data by assuming that its respective data may be received in same order as its respective address was received. Upon servant device 6B identifying its respective data, servants 6A and 6B may automatically output SDI 10A to SDO 12A and SDI 10B to SDO 12B, respectively.

Following the output of the data of servant device 6B, master device 4 in MDO 8 may output the data of servant device 6C (e.g., Data6C) to SDI 10A of servant device 6A. Simultaneously, servants 6A and 6B may automatically output the data of servant device 6C in SDI 10A to SDO 12A, in SDO 12A to SDI 10B, and in SDI 10B to SDO 12B, respectively, as indicated by the down arrows. Additionally, each servant in servants 6 with a response in their register (e.g., Response 6A, Response 6B, or Response 6C), may output the response. For example, servant device 6C may output Response 6A in SDI 10C to SDO 12C as indicated by the diagonal left-to-right arrow, and in SDO 12C to MDI 14 of master device 4 as indicated by the right-to-left arrow.

As illustrated by the bolded rectangle around Data6C in FIG. 3, servant device 6C may identify its respective data by assuming that its respective data will be received in same order as its respective address was received. Upon servant device 6C identifying its respective data, CSN 18 may be set to a HIGH state.

In the example of FIG. 3, Add6A-6C and Data6A-6C may be received and modified in a single SPI communication frame by servants 6 to generate and output GR6A-GR6C and Response 6A-6C. In some examples, in-frame response 50 may be Response 6C, Response 6B, and Response 6C received by master device 4 in MDI 14. In these examples, in-frame response 50 may include the responses received in the same frame as the transmission of the addresses of servants 6 from master device 4.

Figure 4:
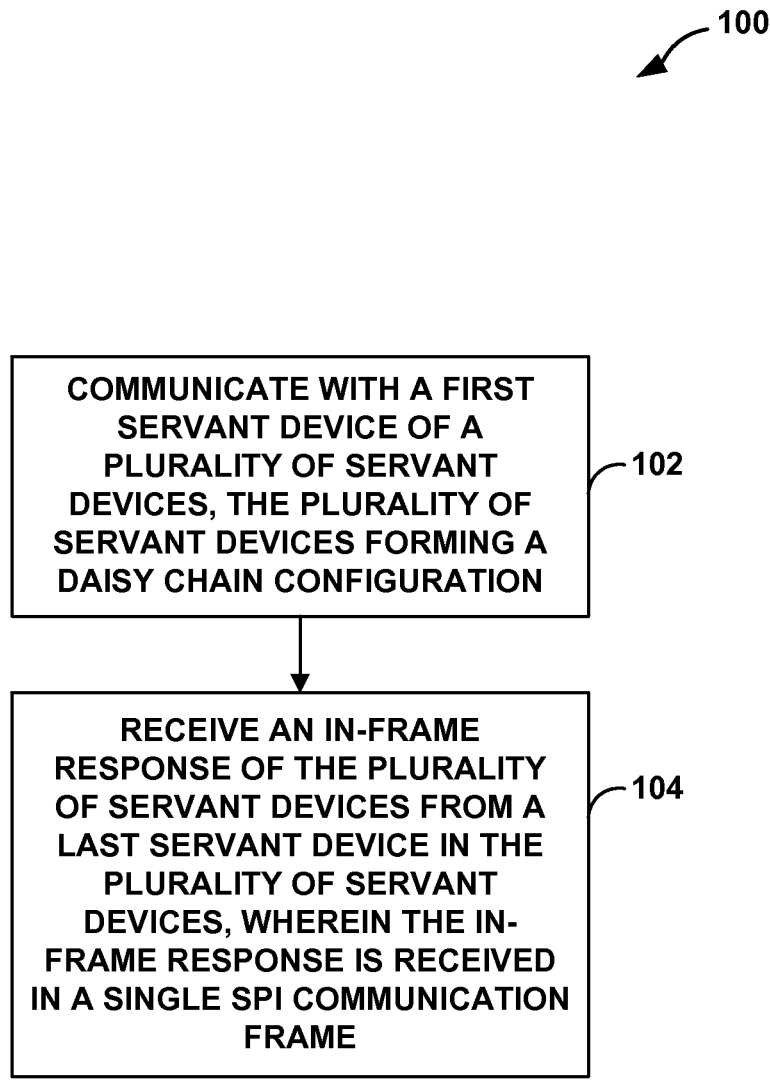
FIG. 4 is a flowchart illustrating an example of operations of a master device in SPI daisy chain communication with a plurality of servant devices, in accordance with one or more aspects of the present disclosure.

FIG. 4 is a flowchart illustrating an example of operations of a master device in SPI daisy chain communication with a plurality of servant devices, in accordance with one or more aspects of the present disclosure. For purposes of illustration only, operations 100 of FIG. 4 are described within the context of system 2 as described in FIG. 1.

In the example of FIG. 4, master device 4 may communicate master data output 8 to servant device 6A of servants 6, servants 6 forming a daisy chain configuration, such that servant device 6A communicates with servant device 6B of the plurality of servant devices (102). Master device 4 may then receive master data input 14 including an in-frame response of servants 6 from a last servant device (e.g., servant device 6C) in servants 6, wherein the in-frame response may be received by master device 4 in a single SPI communication frame (104).

In some examples, a first portion of master data output 8 may include addresses of each servant device in servants 6, wherein a second portion of master data output 8 may include data for each servant device in servants 6, wherein each of the addresses of servants 6 may include at least two bits as a token, and wherein the first and second portions of master data output 8 may form the single SPI communication frame. In some examples, the first portion of master data output 8 may be arranged in an order of the SPI daisy chain configuration. In some examples, the second portion of the plurality of bits may be arranged in the order of the SPI daisy chain configuration. In some examples, master device 4 may not output the second portion of master data output 8 until after each servant device of servants 6 receives a last address of the addresses of servants 6.

In some examples, a first portion of master data input 14 may include global responses of servants 6, wherein each of the global responses of the plurality of servant devices may include a token. In some examples, a second portion of master data input 14 may include the in-frame response of servants 6. In some examples, the first and second portion of master data input 14 may form the single SPI communication frame.

Figure 5:
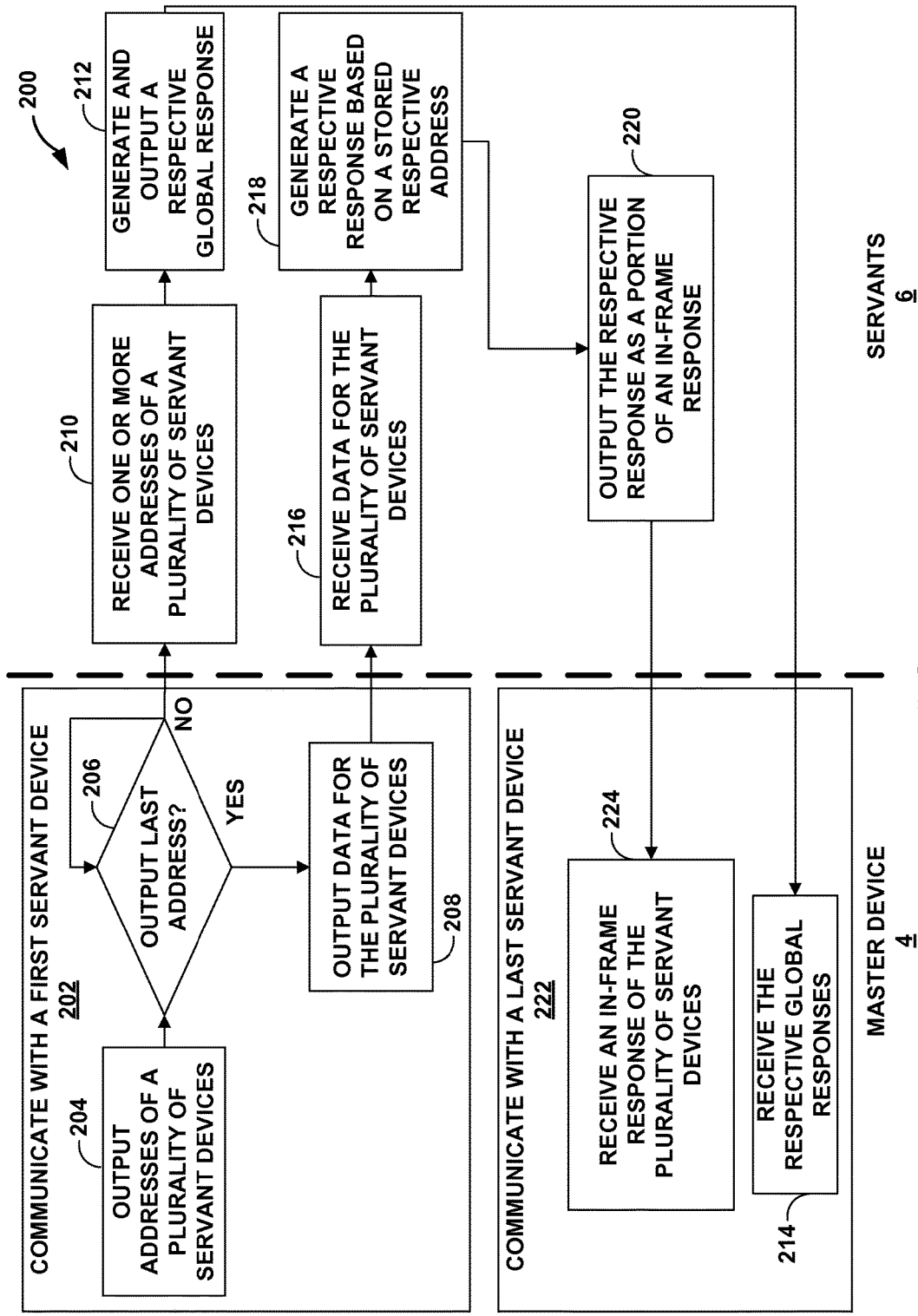
FIG. 5 is a flowchart illustrating another example of operations of a master device in SPI daisy chain communication with a plurality of servant devices, in accordance with one or more aspects of the present disclosure.

FIG. 5 is a flowchart illustrating another example of operations 200 of a master device in SPI daisy chain communication with a plurality of servant devices, in accordance with one or more aspects of the present disclosure. For purposes of illustration only, the operations 200 of FIG. 5 are described within the context of system 2 as described in FIG. 1.

In the example of FIG. 5, master device 4 may communicate with servant device 6A (202) of servants 6 by outputting master data output 8. In some examples, a first portion of master data output 8 outputted by master device 4 may include addresses of each servant device in servants 6 (204). In some examples, master device 4 may output the addresses of servants 6 in the order of the SPI daisy chain configuration. In some examples, master device 4 may include a token in the address of each servant device to indicate whether the address is a leading address or a last address. In some examples, the token may be at least two bits. In some examples, the token may be the least significant bits of the address. Master device 4 may not output the second portion of master data output 8 until after outputting the last address of servants 6 ("No" loop, 206). After outputting the last address of servants 6 ("Yes," 206), master device 4 may output a second portion of master data output 8, which may include data for each servant device in servants 6 (208). In some examples, master device 4 may output the data for the plurality of servant devices in the order of the SPI daisy chain configuration. In some examples, the first and second portions of master data output 8 may form a single SPI communication frame.

In the example of FIG. 5, each servant device of servants 6 may receive one or more addresses of the plurality of servant devices (210). For example, each servant device of servants 6 may receive a servant data input. In this example, a first portion of the servant data input may include one or more addresses of the plurality of servant devices. In some examples, the one or more addresses of servants 6 may be arranged in the order of the SPI daisy chain configuration. In some examples, each of the one or more addresses of servants 6 may include at least two bits as a token. In some examples, the token may be the least significant bits. In some examples, the token may be in a first state (e.g., a LOW bit and a HIGH bit or "01") for leading addresses of servants 6, and in a second state (e.g., two HIGH bits or "11") for a last address of servants 6.

Simultaneously, while receiving the one or more addresses, each servant device of servants 6 may generate and output a respective global response (212), and master device 4 may receive from the last servant device (222) of servants 6 the respective global responses (214). In some examples, the respective global response may be generated (e.g., loaded into the shift register) by each servant device upon the first clock pulses of the serial clock 16 (e.g., SCLK 16). In some examples, the respective global response may be a default response outputted by each servant device. In other examples, the respective global response may be a fault response outputted by each servant device to indicate whether a fault occurred in the last SPI communication frame. In some examples, each servant device may generate the respective global response with a token. For example, each servant device may provide a token with a third state (e.g., a single LOW bit or two LOW bits) to enable other servant devices to differentiate between addresses of servants 6 and global responses of servants 6.

In the example of FIG. 5, each servant device of servants 6 may receive data for the plurality of servant devices (216) after the last address of servants 6 was outputted by master device 4. In some examples, each servant device of servants 6 may not receive data for servants 6 from master device 4 until after each servant device in servants 6 a last address of the one or more addresses of the plurality of servant devices. In some examples, servants 6 may identify the last address based on the token included in each address by master device 4. In some examples, a second portion of a servant data input may include the data for the plurality of servant devices. In these examples, the data for the plurality of servant devices may be arranged in the order of the SPI daisy chain configuration.

Upon identification of the last address, each servant device of servants 6 may generate a respective response based on a stored respective address (218). In some examples, the respective response is generated (e.g., loaded into the shift register) by each servant device upon identification of the last address of the plurality of servant devices. In some examples, each respective response may be based on a stored respective address of each servant device in servants 6, which was outputted by master device 4 as part of the first portion of master data output 8. Simultaneously, while receiving the data, each servant device of servants 6 may output the respective response (220). In some examples, a portion of the in-frame response may be a respective response, which may be based the respective address of the servant device.

In the example of FIG. 5, master device 4 may receive from the last servant device (e.g., servant 6C) of servants 6 (222) the respective responses as an in-frame response (224). In some examples, the respective responses from servants 6 may be in an order inverse to the order of the SPI daisy chain configuration. In some examples, master data input 14 of master device 4 may be received from a last servant device (e.g., servant device output 6C) of servants 6 (222). In some examples, master data input 14 of master device 4 may include the in-frame response of servants 6. In some examples, a first portion of master data input 14 may include global responses of servants 6, wherein each of the global responses of servants 6 may include a token, wherein a second portion of master data input 14 may include the in-frame response of servants 6, and wherein the first and second portion of master data input 14 may form a single SPI communication frame.

Figure 6:
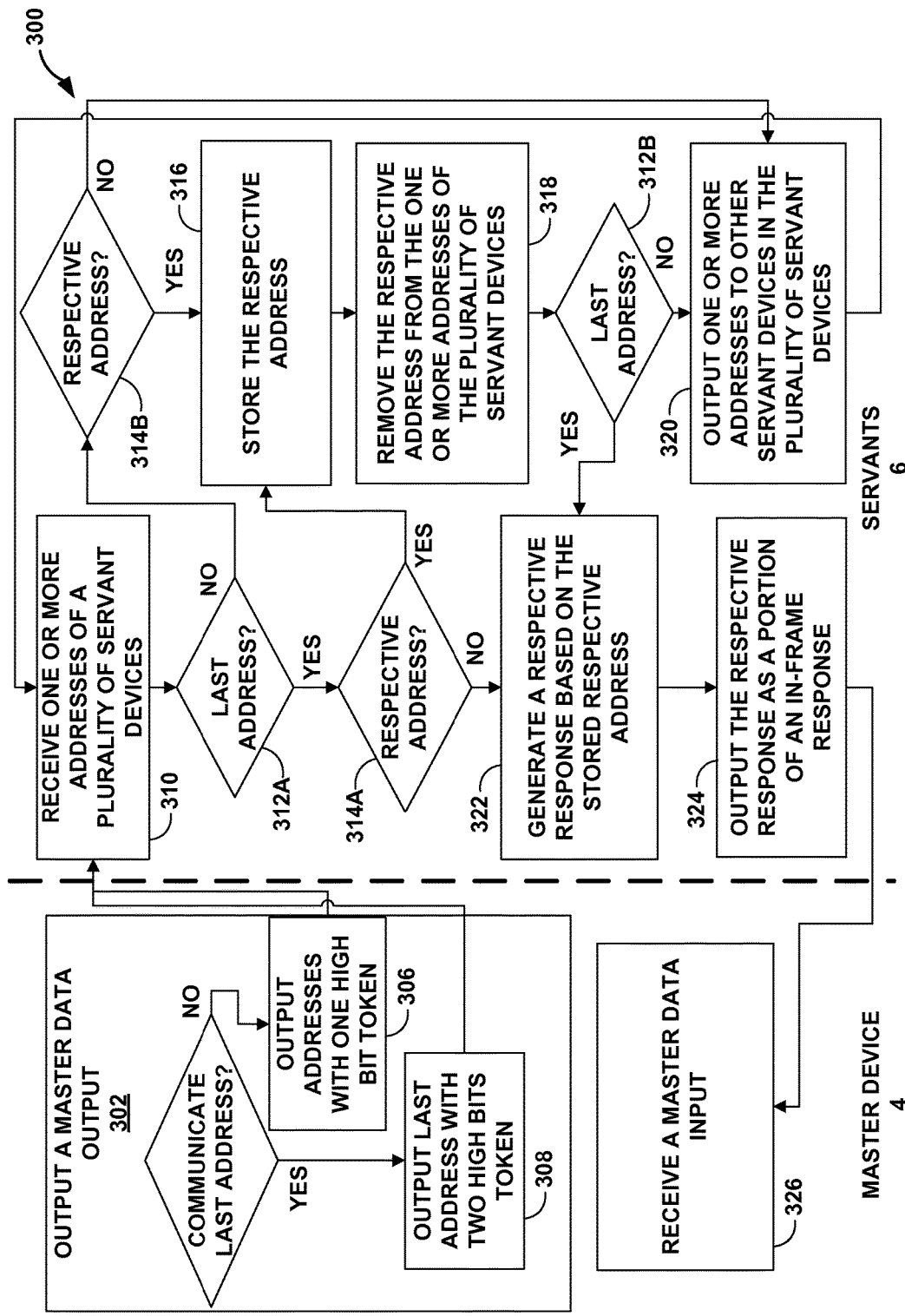
FIG. 6 is a flowchart illustrating a further example of operations of a master device in SPI daisy chain communication with a plurality of servant devices, in accordance with one or more aspects of the present disclosure.

FIG. 6 is a flowchart illustrating a further example of operations 300 of a master device in SPI daisy chain communication with a plurality of servant devices, in accordance with one or more aspects of the present disclosure. For purposes of illustration only, the operations 300 of FIG. 6 are described within the context of system 2 as described in FIG. 1.

In the example of FIG. 6, master device 4 may communicate with servant device 6A (302) of servants 6. In some examples, master device 4 may output addresses to servants 6. In these examples, master device 4 may output leading addresses with a token of a first state (e.g., one HIGH bit (e.g., "1" or "01"), and a last address of servants 6 with a token of a second state (e.g., two HIGH bits or "11").

In the example of FIG. 6, each servant device of servants 6 may receive one or more addresses of servants 6 (310). Upon receiving the one or more addresses of servants 6, each servant device of servants 6 may identify whether the one or more addresses may be a last address (312A). In some examples, each servant device of servants 6 may identify the last address based on the token included in each address of servants 6 by master device 4. For example, each servant device may identify an address with a second state (e.g., two HIGH bits) in the token to be the last address, and an address with a first state (e.g., a single HIGH bit) in the token to not be the last address.

If an address of the one or more addresses is a last address ("YES," 312A), then each servant device may determine whether the last address is their respective address (314A). In some examples, the last address is a respective address to the last servant device (e.g., servant device 6C).

If the last address is not a respective address ("NO," 314A), then each servant device may generate a respective response based on their stored respective address (322). After generating their respective response, each servant device may output their respective response as a portion of an in-frame response (324).

If the last address is a respective address ("YES," 314A), then the last servant device may store the respective address (316). After storing the respective address (316), the last servant device may remove the respective address from the one or more addresses of servants 6 (318). Upon removing the respective address, the last servant device may determine that the stored respective address is the last address ("YES," 312B), and the last servant device may generate a respective response based on the stored respective address (322). After generating the respective response, the last servant device may output the respective response as a portion of an in-frame response (324) to master device 4.

If an address of the one or more addresses is not a last address ("NO," 312A), then each servant device may determine whether the address is their respective address (314B). If the address is not a respective address ("NO," 314B), then each servant device may output the address to other servant devices in servants 6.

If the address is a respective address ("YES," 314B), then each servant device may store the respective address (316). After storing the respective address (316), each servant device may remove their respective address from the one or more addresses of servants 6 (318). Upon removing the respective address, each servant device may determine whether the one or more addresses may include a last address (312B). If the one or more address does not include a last address ("NO," 312B), then each servant device may output the one or more addresses to other servant devices in servants 6 (320). If the one or more addresses does include a last address ("YES," 312B), then each servant device may generate their respective responses based on their stored respective address (322). After generating their respective responses, each servant device may output their respective responses as a portion of an in-frame response (324).

In the example of FIG. 6, master device 4 may receive from the last servant device (e.g., servant 6C) master data input 14, which may include an in-frame response from servants 6. In some examples, a second portion of master data input 14 may include the in-frame response of servants 6. In these examples, the in-frame response may be the respective responses of each servant device in servants 6. In some examples, the respective responses of servants 6 may be received master device 4 in an order inverse to the SPI daisy chain configuration. In some examples, the in-frame response may be received by master device 4 in a single SPI communication frame.

In one or more examples, the functions described may be implemented in hardware, software, firmware, or any combination thereof. If implemented in software, the functions may be stored on or outputted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A master device, wherein the master device is configured to:
   output a master data output to a first servant device of a plurality of servant devices, wherein the plurality of servant devices is connected in a serial-peripheral interface (SPI) daisy chain configuration with the master device, wherein the SPI comprises a chip select signal, a serial data in signal, a serial data out signal and a clock signal; and
   receive a master data input directly from a last servant device of the plurality of servant devices, wherein the master data input comprises an in-frame response of the plurality of servant devices, wherein the in-frame response is received by the master device in a single SPI communication frame, and wherein respective responses from the plurality of servant devices are arranged within the in-frame response so that the respective responses from the plurality of servant devices are received by the master device in an order inverse to the SPI daisy chain configuration.

2. The master device of claim 1, wherein a first portion of the master data output includes addresses of the plurality of servant devices, wherein a second portion of the master data output includes data for the plurality of servant devices, and wherein the first and second portions of the master data output comprise the single SPI communication frame.

3. The master device of claim 2, wherein the master device does not output the second portion of the master data output until after each servant device of the plurality of servant devices receives a last address of the addresses of the plurality of servant devices.

4. The master device of claim 2, wherein the addresses of the plurality of servant devices of the master data output are in an order of the SPI daisy chain configuration, and wherein the data for the plurality of servant devices of the master data output are in the order of the SPI daisy chain configuration.

5. The master device of claim 4, wherein the in-frame response comprises respective responses from the plurality of servant devices, wherein the respective responses are based on the addresses of the plurality of servant devices.

6. The master device of claim 2, wherein each of the addresses of the plurality of servant devices includes a token.

7. The master device of claim 6, wherein the token is at least one of:
 a first state, wherein the first state is indicative of leading addresses of the addresses of the plurality of servant devices; and
 a second state, wherein the second state is indicative of a last address of the addresses of the plurality of servant devices.

8. A servant device of a plurality of servant devices, wherein the servant device is configured to:
 receive a servant data input, wherein the plurality of servant devices is connected in a serial-peripheral interface (SPI) daisy chain configuration with a master device, wherein the SPI comprises a chip select signal, a serial data in signal, a serial data out signal and a clock signal; and
 output a servant data output,
  wherein the servant data output includes a portion of an in-frame response based on the servant data input, and
  wherein the in-frame response is received by the master device in a single SPI communication frame and respective responses from the plurality of servant devices are arranged within the in-frame response so that the respective responses from the plurality of servant devices are received by the master device in an order inverse to the SPI daisy chain configuration.

9. The servant device of claim 8, wherein a first portion of the servant data input includes one or more addresses of a plurality of servant devices, wherein a second portion of the servant data input includes data for the plurality of servant devices, and wherein the first and second portions of the servant data input comprise the single SPI communication frame.

10. The servant device of claim 9, wherein the one or more addresses of the plurality of servant devices of the servant data input are arranged in an order of the SPI daisy chain configuration, and wherein the data for the plurality of servant devices of the servant data input are arranged in the order of the SPI daisy chain configuration.

11. The servant device of claim 9, wherein the servant device is further configured to:
 store a respective address of the servant device;
 remove the respective address from the servant data input;
 identify a last address in the first portion of the servant data input;
 generate a respective response based on the stored respective address upon identifying the last address in the first portion of the servant data input; and
 output the respective response as the portion of the in-frame response in the servant data output.

12. The servant device of claim 8, wherein a first portion of the servant data output includes one or more global responses of the plurality of servant devices, wherein a second portion of the servant data output includes one or more addresses of the plurality of servant devices, wherein a third portion of the servant data output includes one or more responses of the plurality of servant devices, and wherein a fourth portion of the servant data output includes data for the plurality of servant devices.

13. The servant device of claim 12, wherein each of the one or more addresses of the plurality of servant devices includes at least two bits as a token, wherein each of the one or more global responses includes the token, and wherein the at least two bits are least significant bits.

14. The servant device of claim 13, wherein the token is selected from a group consisting of:
 a first state, wherein the first state is indicative of leading addresses of the addresses of the plurality of servant devices;
 a second state, wherein the second state is indicative of a last address of the addresses of the plurality of servant devices; and
 a third state, wherein the third state is indicative of the one or more global responses of the plurality of servant devices.

15. The servant device of claim 8, wherein the portion of the in-frame response comprises a respective response based on a respective address of the servant device.

16. A system comprising:
 a master device; and
 a plurality of servant devices connected in a serial-peripheral interface (SPI) daisy chain configuration with the master device, wherein the SPI comprises a chip select signal, a serial data in signal, a serial data out signal and a clock signal,
 wherein the master device is configured to:
 communicate with a first servant device and a last servant device of the plurality of servant devices,
 communicate a master data output to the first servant device of the plurality of servant devices, and
 receive a master data input including an in-frame response of the plurality of servant devices from the last servant device in the plurality of servant devices,
 wherein the in-frame response is received by the master device in a single SPI communication frame, and
 wherein respective responses from the plurality of servant devices are arranged within the in-frame response so that the respective responses from the plurality of servant devices are received by the master device in an order inverse to the SPI daisy chain configuration.

17. The system of claim 16, wherein a first portion of the master data output includes addresses of the plurality of servant devices, wherein each of the addresses of the plurality of servant devices includes a token, wherein a second portion of the master data output includes data for the plurality of servant devices, and wherein the first and second portions of the master data output comprise the single SPI communication frame.

18. The system of claim 17, wherein a first portion of the master data input includes global responses of the plurality of servant devices, wherein each of the global responses of the plurality of servant devices includes the token, wherein a second portion of the master data input includes the in-frame response of the plurality of servant devices, and wherein the first and second portions of the master data input comprise the single SPI communication frame.

19. The system of claim 18, wherein the token is selected from a group consisting of:
   a first state, wherein the first state is indicative of leading addresses of the addresses of the plurality of servant devices;
   a second state, wherein the second state is indicative of a last address of the addresses of the plurality of servant devices; and
   a third state, wherein the third state is indicative of the global responses of the plurality of servant devices.

20. The system of claim 16, wherein each servant device of the plurality of servant devices is configured to:
   receive a servant data input, wherein the servant data input includes addresses of the plurality of servant devices;
   store a respective address of the servant device;
   remove the respective address from the servant data input;
   identify a last address in the addresses of the servant data input;
   generate a respective response based on the stored respective address upon identifying the last address in the addresses of the servant data input; and
   output the respective response as a portion of the in-frame response in a servant data output.

* * * * *